March 17, 1970

F. HOM ET AL 3,500,646

THRUST REVERSER

Filed April 19, 1968

INVENTOR.
F. HOM
G. E. MEDAWAR

BY *George E. Pearson*

ATTORNEY

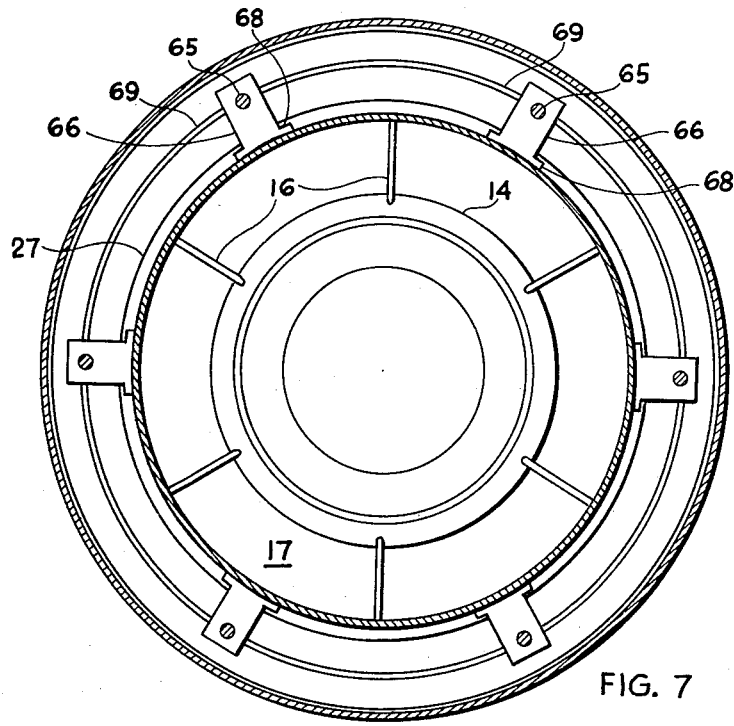
FIG. 7
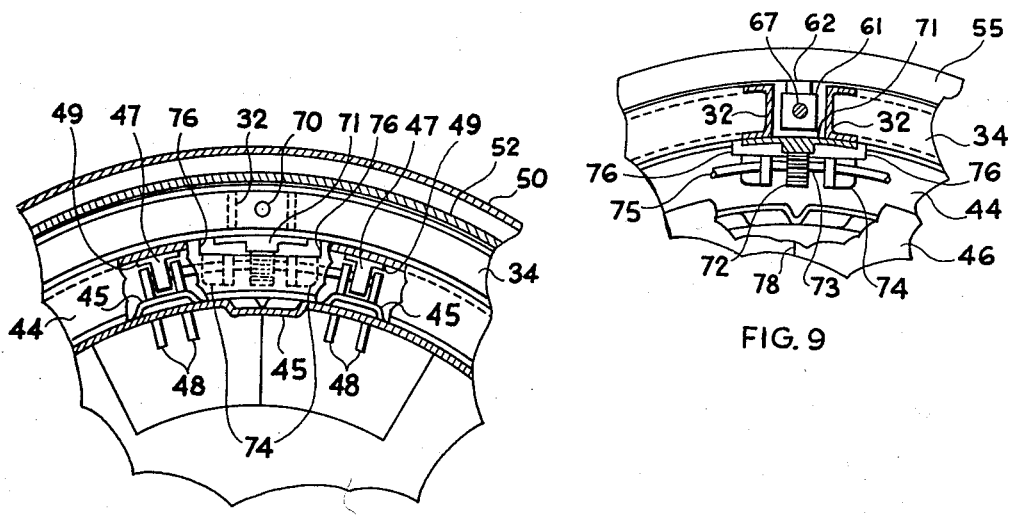
FIG. 8
FIG. 9
INVENTORS
F. HOM
G. E. MEDAWAR
BY
ATTORNEY

INVENTORS.
F. HOM
G. E. MEDAWAR
BY
ATTORNEY

United States Patent Office 3,500,646
Patented Mar. 17, 1970

3,500,646
THRUST REVERSER
Felix Hom, La Mesa, and George E. Medawar, San Diego, Calif., assignors to Rohr Corporation, Chula Vista, Calif., a corporation of California
Filed Apr. 19, 1968, Ser. No. 722,687
Int. Cl. F02k 1/00, 3/02; B64c 15/04
U.S. Cl. 60—229    10 Claims

ABSTRACT OF THE DISCLOSURE

A thrust reverser arrangement for a fan type jet propulsion engine includes a fixed ring of flow reversing cascades which are uncovered when the aft portion of a split cowl for the engine fan is translated rearwardly to an extended position. During the translational movement of the aft portion, peripherally disposed blocker doors which are pivotally secured to the aft cowl portion are rotated into position to block the fan air and force the same through the cascades. Rotary actuators carried by the forward cowl portion have threaded shafts which drive threaded members secured to the aft cowl portion to translate the same. Right angle drives operated by the threaded shafts are operatively connected together to synchronize the rotary actuators. Peripherally spaced gear racks are supported on the ring of cascades and extend longitudinally thereof, and gears supported on the aft cowl portion and disposed respectively in meshed engagement with the racks rotate therealong as the aft cowl portion translates. The gears act through flexible shafts to operate power hinges for rotating the doors.

In an alternative arrangement, linear actuators are employed to translate the aft cowl portion, and rotary motors are employed to rotate the doors independently of the translational movement of the aft cowl portion.

BACKGROUND OF THE INVENTION

This invention relates generally to thrust reversers for bypass fan type jet propulsion engines and more particularly to improvements therein.

Various thrust reversers of this type have heretofore been provided in which a translatable fan cowl portion is moved to expose a ring of flow reversing cascades to which the normal fluid flow through the bypass duct is diverted by a plurality of blocker doors or flaps which have been rotated into position to block the bypass duct. While such prior art reversers have been generally suitable for the purposes intended, they have had several structural and functional limitations imposed by the specific structure and combination of parts employed to accomplish the reverser function without compromising any of the aerodynamic characteristics, performance, and functions desired of the engine. For example, it has been considered desirable to provide a reverser capable of interfitting with the aircraft structure as it exists to effect other aerodynamic functions while also being capable of supplying thrust modulation characteristics to provide for immediate and full thrust during a landing operation while also maintaining the engine at its full rotating speed and without changing loading on the fan or gas generator. It further has been considered important that the reverser have a fail-safe characteristic enabling it to retain a specific position, that is, in the event of structural failure, that it will stay in a reverse thrust position while being used as a landing roll reverser, or to return to a fully stowed position while being used for thrust modulation in a cruise condition.

SUMMARY OF THE INVENTION

In accordance with the present invention, the thrust reverser hereinafter disclosed and claimed is adapted particularly for use with a jet propulsion powerplant of the front fan bypass type having an engine and a fan concentric therewith and extended radially beyond the wall of the engine. A cowl surrounds the fan and is spaced from the engine wall to provide a bypass duct therewith. The cowl is split into fore and aft cylindrical portions which form inner and outer flow surfaces when closed in cruise position.

A plurality of peripherally disposed rotary actuators are secured to the forward cowl portion and have drive shaft members which extend longitudinally into the aft cowl portion. Threadedly engaged support elements on the drive shaft members are secured to the aft cowl portion for translational support of the same on the shafts to an extended position rearwardly of the forward cowl portion to thus develp an annular opening therebetween. A ring of flow reversing cascades secured to the forward cowl portion is disposed within the region of this opening, and the cascades become fully exposed when the aft cowl portion is telescopically moved thereover into its extended position. The ring of cascades have longitudinal channels through which the support elements move translationally along the drive shaft members which extend to the end ring of the cascade structure where the shafts conveniently are journalled.

A plurality of peripherally disposed blocker flaps or doors are pivotally secured respectively by power hinges to a forward end ring member of the aft cowl portion, and the doors form a part of the inner flow surface of the aft cowl portion when in its cruise position. Right angle drives and flexible shafts operatively connect the actuator drive shaft members together at their upstream ends thereby to synchronize the operation of the actuators.

The ring of cascades support a plurality of peripherally spaced gear racks which extend longitudinally thereof. Each gear rack has associated in meshed engagement therewith, a gear which is supported on the aforesaid aft cowl end ring and adapted to be rotated along the rack as the aft cowl portion moves translationally. These gears drive suitable gear trains which have flexible shaft connections with the power hinges to cause the doors to be synchronously rotated into position to block the bypass duct as the aft cowl portion moves translationally to its extended position. The doors in their extended rotated position engage the engine wall to block the bypass duct and force the normal flow of bypass air to pass through the flow reversing cascades to thus produce the desired reverse thrust. The actuator drives will retain the parts in their moved positions, and in the event of structural failure, a fail-safe operating condition is provided in that the blocker doors, if moved into blocking position, will thereby retain such position.

In an alternative arrangement, the aft cowl portion is mounted slidably on the cascade ring structure for movement telescopically thereover, and hydraulic type linear actuators are employed to effect this translational movement. Rotary air motors having flexible shaft connections with the power hinges are employed to rotate the doors between stowed and blocking positions independently of the translational movement of the aft cowl portion. The hydraulic actuators and air motor drives may be selectively operated to modulate the positional movements of their respective aft cowl portion and doors.

OBJECTS

An object of the present invention is to provide a new and improved thrust reverser arrangement for bypass type turbojet engines which retains all of the advantages of prior art reversers.

Another object is to provide a reverser arrangement of this type which may be employed effectively with existing an engine structures without compromising any of the aerodynamic characteristics desired for other functions of the engine.

Another object is to provide such a reverser arrangement in which the flow reversing cascades are opened and the blocker doors are closed in a manner to cause only a minimum of interference with the normal operation of the engine during thrust modulation of the reverser.

Another object is to provide such a reverser arrangement in which the translational and rotational movements of the aft cowl portion and blocker doors is effected by simple actuating means which also serve to support these members for their respective movements thereby minimizing the number of elements required for the purpose.

Yet another object is to provide such a reverser arrangement in which the translational movement of the blocker doors is utilized to rotate the same independently of the drive for producing the translational movement of the aft cowl portion.

Still another object is to provide a thrust reverser arrangement of the aforedescribed type which is effective in the event of a structural failure to assume a fail-safe position in which the reverser retains its deployed or thrust reversing position.

Still other features, advantages and objects of the present invention are inherent in or to be implied from the novel construction, combination and arrangement of the parts constituting a preferred embodiment of the invention as will become more fully apparent as the description proceeds.

BRIEF DESCRIPTION OF THE DRAWINGS

In the accompanying drawings:

FIG. 7 is a sectional view as seen along the line 7—7 of FIG. 3;

FIG. 8 is a somewhat enlarged fragmentary sectional view of the door and power hinge arrangement as viewed along the line 8—8 of FIG. 4;

FIG. 9 is a fragmentary sectional view of the rack and gear drive as viewed along the line 9—9 of FIG. 5;

THE SPECIFICATION

Figure 1:
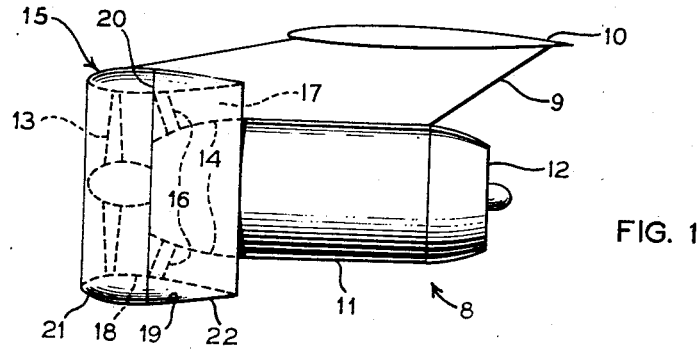
FIG. 1 is a view in elevation of a fan type jet propulsion powerplant supported from an aircraft wing and employing the thrust reverser of the present invention.

Referring now to the drawings for a more complete understanding of the invention, and first more particularly to FIG. 1, a fan type engine generally designated 8 is shown supported by a pylon 9 from an aircraft wing 10. Fan type engine 8 comprises a jet engine 11 which discharges a gaseous effluent through nozzle 12 to provide thrust. In this case, the gas jet thrust is augmented by air flow produced by a fan 13 driven by and disposed concentric with the engine 11 and extended radially beyond the wall 14 thereof. A cowling generally designated 15 is spaced from and supported by suitable struts 16 extended from the engine wall 14 to form a bypass duct 17 for flow of the fan air therebetween.

Figure 2:
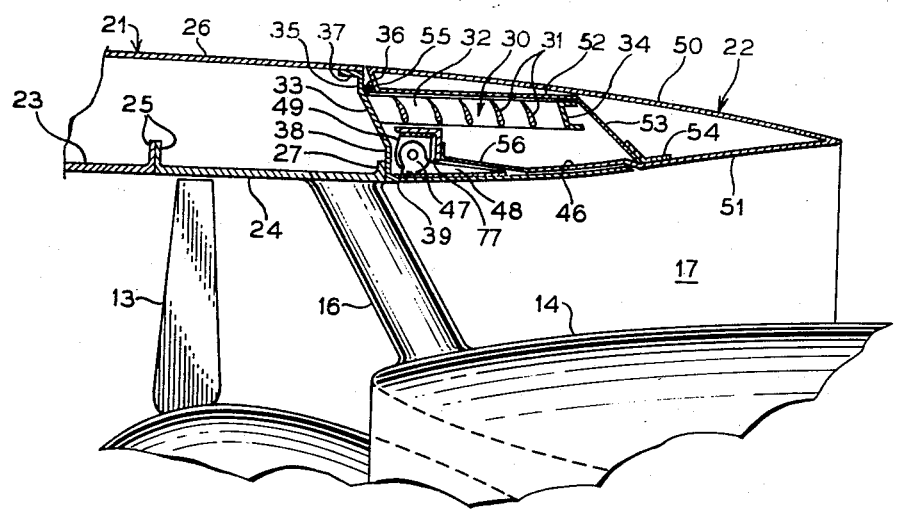
FIG. 2 is an enlarged cross-sectional view of the thrust reverser in its cruise position and taken in the region of a power hinge.
Figure 3:
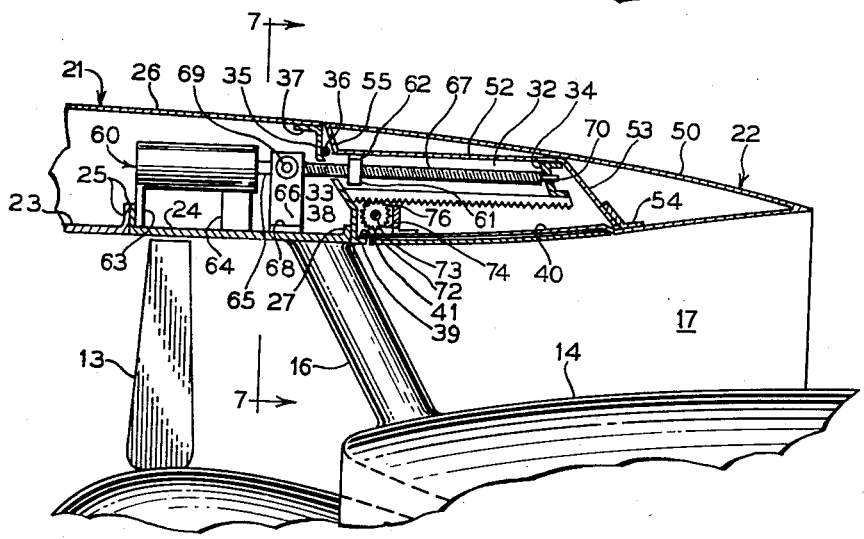
FIG. 3 is a view similar to FIG. 2 taken in the region of a rotary actuator and a rack and gear drive.

For purposes of the present invention, and in order to provide a simple, light weight structure for reversing the fan air flow through the bypass duct 17 without compromising the physical characteristics of the engine geometry while also providing a minimum cowling thickness between its inner and outer flow surfaces 18 and 19, respectively, the cowling 15 is used as part of the reverser structure and, to this end, is split along the peripheral line 20 to form a forward cowl portion 21 and an aft cowl portion 22, both portions of which form inner and outer flow surfaces 18 and 19 in the cruise position of the thrust reverser as shown in FIGS. 2 and 3.

Referring now to FIGS. 2 to 9, the forward cowl portion 21 comprises inner cowl panels 23 and 24 which are suitably joined as by their outwardly directed and engaging flanges depicted at 25, panel 24 being suitably joined to strut 16. Forward cowl portion 21 also comprises an outer cowl panel 26 which together with inner panel 24 supports the cascades generally designated 30, inner panel 24 having for this purpose, an outwardly directed flange 27.

Cascade ring 30 has the usual flow reversing cascades 31 which extend between channel members 32, FIG. 9. Channel members 32, in turn, extend between and are secured to upstream and downstream end rings 33 and 34, respectively. Upstream end ring 33 has an outwardly directed flange portion 35 which forms a seat for a sealing ring 36, and a forwardly directed flange portion 37 which connects with forward cowl panel 26 in any suitable manner. End ring 33 also has an inwardly directed flange portion 38 which makes a suitable connection with panel flange 27 and a rearwardly directed flange portion 39 which, as best seen in FIG. 3, supports a door seat panel member 40 at its upstream end 41.

Aft cowl portion 22 comprises an outer cowl panel section 50 which together with panel 26 of forward cowl portion 21 forms the outer cowling surface 19, FIG. 1, when aft cowl portion 22 is in its cruise position. Cowl portion 22 also comprises an inner cowl panel section 51 which is joggled at 43 to provide the aforementioned door seats 40, FIG. 6, with the result that unjoggled wedge shaped panel portions or islands 45 occur between adjacent pairs of the door seats 40. Panel 51 with its islands 45 and blocker doors or flaps 46 which are nested between the islands and seated against the door seats 40, together with the cowl panels 23 and 24 of the forward cowl portion 21 constitute the inner flow surface 18, FIG. 1, of the cowling when the aft portion 22 is in its cruise position. Aft portion 22 further comprises a longitudinal panel section 52 which, at its downstream end, has a ring section 53 by which it is joined to inner panel section 51 by an angled ring member 54, and joined at its upstream end to outer panel section 50 by an inclined ring member 55 which moves to engage ring 36 in sealing engagement therewith when the aft cowl portion is moved into its cruise position, as shown in FIGS. 2 and 3.

Figure 4:
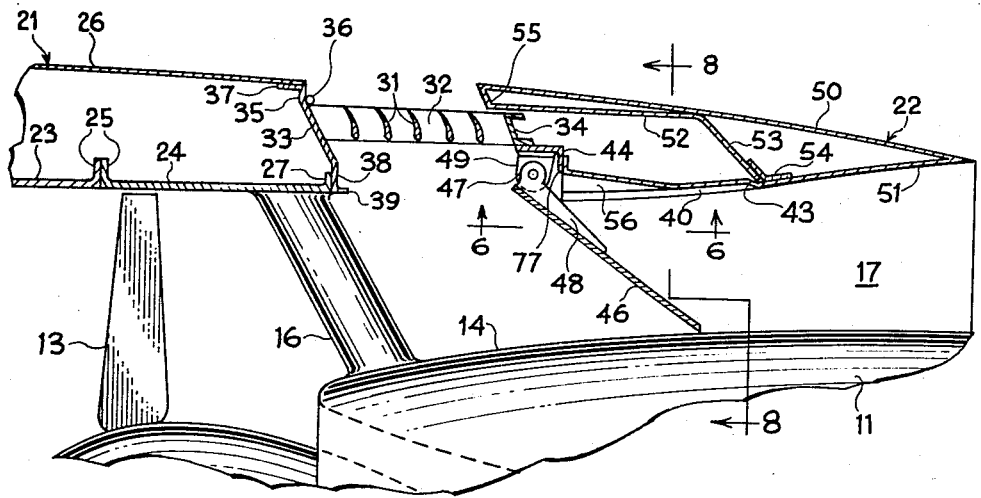
FIG. 4 is a view similar to FIG. 2 and showing the reverser in its reverse thrust position.
Figure 5:
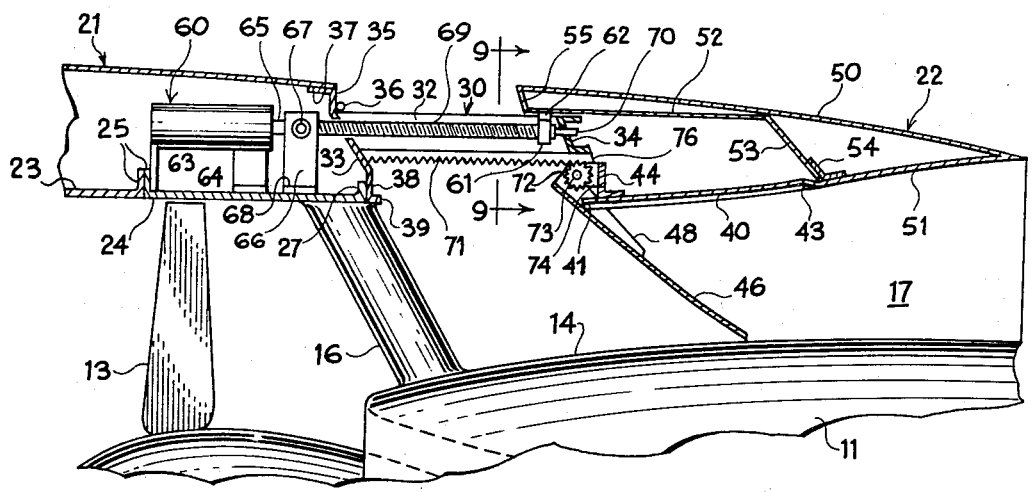
FIG. 5 is a view similar to FIG. 3 and showing the reverser in its reverse thrust position.

Longitudinal panel section 52 extends parallel to the outer surface of cascade ring 30 and moves telescopically over the flow reversing cascades 31 as the aft cowl portion 22 is moved between its stowed position of FIGS. 2 and 3 and its deployed position of FIGS. 4 and 5, thereby to cover or expose the cascades, as the case may be. Aft cowl portion 22 is a unitary structure; panel and ring sections 50, 51, 52 and 55, for example, as shown, constituting a single annular member of tubular cross section, and panel section 52 together with the door seats 40 and islands 45 providing therebetween an annular chamber for receiving the ring of cascades therewithin as the aft cowl portion moves into cruise position.

Figure 6:
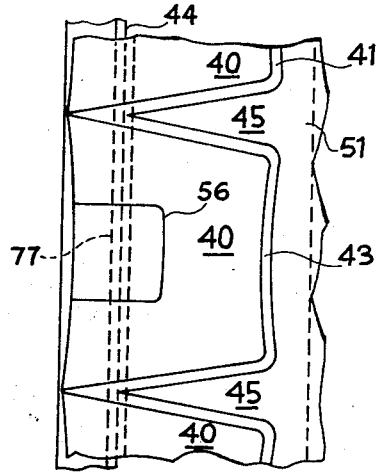
FIG. 6 is a fragmentary view as seen along the line 6—6 of FIG. 4 of the door seat arrangement, the doors being removed.

Panel 51 is strengthened at its upstream end 41, FIG. 6, by an angle ring member 44 which supports a plurality of peripherally spaced power hinges 47, there being one for each door 46, as best seen in FIG. 8. Each hinge 47 comprises a pair of outer hinge arms 48 which rotate in unison about the hinge axis and serve to fasten its associated door to the hinge by any suitable means, and each hinge also comprises a central hinge arm 49, FIGS. 2, 4 and 8, which also rotates about the hinge axis and serves to fasten the hinge by any suitable means to angle ring member 44. The door seats 40, FIGS. 4 and 6, have hollow webs 56 into which the hinge arms 48 move as the doors move into seated position on panel 51.

Power hinges 47 may be of any type suitable for the purpose such, for example, as the "Power Hinge" manufactured by the Curtiss-Wright Corporation, Dayton, Ohio, Drawing No. 174,643. The operation of such hinges is well known. It suffices to state herein that the hinge arm members 48 and 49 are coupled internally by gearing having an input drive disposed coaxially of the hinge.

A plurality of rotary actuators 60, each of which is mounted as by fore and aft supports 63 and 64 to the inner cowl panel 24 of the forward cowl portion 21. Each actuator has a drive shaft 65 which, at its upstream end portion, first passes through a right angle drive 66, and then has a threaded portion 67 which passes freely through an opening provided therefor in upstream cascade end ring 33, an associated nut 61 being threadedly engaged on shaft portion 67 and translatable therealong as the shaft is rotated. Nut type drive members 61 are suitably secured, as depicted at 62, FIGS. 3, 5 and 9, to the upstream end of longitudinal panel section 52 to thus provide for the translational support and movement of the aft cowl portion 22. As seen in FIGS. 3, 5 and 9, nut members 61 and their drive shafts pass between adjacently disposed cascade channel members 32 which, as aforementioned, support the cascades in a well-known manner and extend between cascade end rings 33 and 34. Drive shafts 65 have reduced diameter end portions 70 which are suitably journalled in the downstream cascade end ring 34.

Each right angle drive 66 is suitably secured as by attachment means 68 to cowl panel 24 and contains a suitable right angle drive mechanism such, for example, as the well-known arrangement of a pair of engaged bevel gears (not shown). As best seen in FIG. 7, right angle drives 66 are operatively coupled together for synchronous operation by means of flexible cables 69 which extend therebetween.

As best seen in FIG. 9, each pair of adjacently disposed channel members 32 is bridged by a gear rack member 71 which is suitably secured to these members. A gear 72 is disposed in meshed engagement with each gear rack 71, and each gear has a stub shaft 73 supported for rotation in a pair of angle brackets 74 disposed on each side thereof and suitably secured to angle member 44. Flexible shaft connections 75 extend from gear shaft 73 to the input of the power hinge 47 for the associate door 46, there being one gear 72 for each pair of adjacently disposed doors. It will be understood that power hinges 47 have suitable gearing so that doors 46 are rotated to their extended deployed position, as shown in FIGS. 4 and 5, when drive shafts 65 have rotated a sufficient number of revolutions to advance nut members 61 and their associated aft cowl portion 22 to deployed position. As seen in FIGS. 3, 5, 8 and 9, angle member 44 is cut away in the region of gear 72 as depicted at 76 to clear gear rack 71, and as seen in FIGS. 2, 4 and 6 is further cut away as depicted at 77 to clear the door hinge arms 48.

From the foregoing description of the parts and their manner of arrangement and interconnection, the operation of the reverser is deemed to be fully apparent. It will suffice therefore merely to point out that the actuator drive shafts 65, in the manner of cantilever beams supported by the forward cowl portion 21, provide the translational support for the aft cowl portion 22 as the same moves telescopically over and without sliding contact with the cascades 31 to expose, or to cover, the same. The associated nut members 61 in threaded engagement on the threaded portions 67 of the shafts provide this support and also cause the translational movement as the shafts are rotated synchronously by reason of the drive coupling therebetween. It will also be apparent that gears 72 in meshed engagement with their associated gear rack members 71 will rotate as the aft cowl portion 22 translates, and gears 72 acting through the power hinges 47 will cause rotation of the doors 46 between the stowed and blocker positions thereof as the aft cowl portion is moved translationally between its comparable positions. It will be noted, however, that unlike most prior art reversers of this type, the blocker doors in the instant case provide these required blocker door functions independently of the translational drive per se, and only as a result of the translational movement of the aft cowl portion, thereby providing a more simple and effective mechanism for the purpose.

With the doors in their deployed positions, the same meet along their abutting side edges 78, FIGS. 8 and 9, to block the bypass duct 17 and force the fan air through the cascades and thence forwardly of the forward cowl portion 21.

It will further be apparent that in view of the nature of the screw drives, the aft cowl portion will hold a position to which it is moved translationally by rotation of drive shafts 65 effected through operation of the actuators 60. It will be additionally apparent that doors 46 once moved by reason of movement of the aft cowl portion will hold this position, such, for example, as the deployed position, thus to provide a fail safe operating condition.

Figure 10:
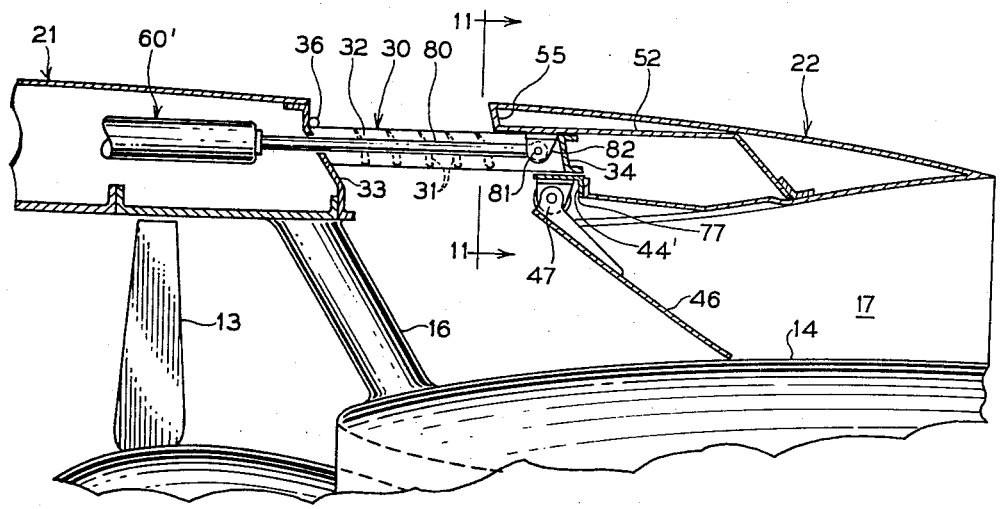
FIG. 10 is a view similar to FIG. 4 and showing an alternative arrangement of the thrust reverser.
Figure 11:
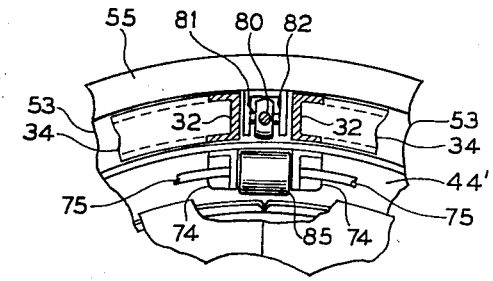
FIG. 11 is a fragmentary sectional view similar to FIG. 10 as seen along the line 11—11 of FIG. 10.

Referring now to FIGS. 10 and 11, the thrust reverser arrangement disclosed therein is generally the same as disclosed in FIGS. 1 to 9, and the same reference characters are employed to designate the same parts, the forward and aft cowl portions 21 and 22, the ring of cascades 30 and the doors 46 being constructed, mounted and arranged as in the previously described embodiment. Aft cowl portion 22 in FIG. 10, however, is translated rearwardly to the position shown by a plurality of peripherally spaced and synchronously operated hydraulic type linear actuators such as actuator 60' which may be suitably supported in a well-known manner within the forward cowl portion 21. Each actuator 60' has the actuator rod 80 thereof extended through an opening therefor in cascade end ring 33, and thence through a cascade channel provided between adjacently disposed channel members 32, FIG. 11, to make a pivotal connection 81 with a bifurcated bracket 82 which is secured to panel section 52 of aft cowl portion 22. Each bracket 82 for each actuator shaft 80 is thus arranged to move therewith along and through the associated cascade channel as the aft cowl portion moves between its stowed and deployed positions relative to the cascades 31, the aft cowl portion, in this case, having suitable sliding supports as, for example, between panel section 52 and the cascade channel members 32.

In the arrangement of FIGS. 10 and 11, each pair of angle brackets 74 supports an air motor 85 whose dual coaxial outputs make connections with flexible shafts 75 to rotate doors 46 synchronously in the manner of the synchronous drive coupling between the right angle drives 66 of FIG. 7, thereby to move and modulate the movement of the doors in unison between their stowed and deployed positions independently of the translational movement of the aft cowl portion. Air motors 85 may be of any type suitable for this purpose such, for example, as the motors manufactured by Airesearch Mfg. Co. of Los Angeles, Calif. Angle member 44' which supports the motor support brackets 74, unlike gear support member 44, is not cut away in the region of each motor 85 since the rack and gear arrangement of FIGS. 1 to 9 is not required.

From the foregoing it will now be apparent that thrust reverser arrangements have been provided which are well adapted to fulfill the aforestated objects of the invention and that while the invention has been described with reference to two embodiments for purposes of illustration, it will be apparent that other forms of the invention are possible.

Having thus described the invention, what is claimed and desired to be secured by Letters Patent is:

1. A thrust reverser for a fan type jet propulsion engine having an inner wall and a fan concentric therewith extended radially beyond said wall, comprising, a cowling surrounding said fan and spaced from said wall to form a bypass duct, said cowling being split into abutting forward and aft cowl portions forming inner and outer flow surfaces in cruise position, a ring of flow reversing cascades disposed within said cowling and secured to said forward cowl portion, a plurality of peripherally disposed blocker doors pivoted to said aft portion and forming part of the inner flow surface thereof in cruise position, actuating means disposed within said cowling and controllably connecting said aft cowling portion for translating said aft portion downstream to an extended position for uncovering said cascades, and gearing means responsive to the translational movement of the aft cowl portion for rotating said doors into extended blocking position in said duct during the translational movement of the aft portion to said extended downstream position thereof thereby substantially to open the flow areas through the cascades concurrently with the blocking of the flow area through said duct.

2. A thrust reverser as in claim 1 wherein said actuating means comprises a plurality of rotary actuators having peripherally spaced drive shafts and translatable members threadedly engaged respectively with said shafts and secured to the aft cowl portion for translational movement therewith.

3. A thrust reverser as in claim 2 wherein said drive shafts are operably coupled together, thereby to synchronize the operation of said rotary actuators.

4. A thrust reverser as in claim 1, said means for rotating the doors comprising a plurality of peripherally spaced gear racks supported longitudinally on said ring of cascades, a plurality of gears disposed respectively in meshed engagement with said racks and rotatively supported on said aft cowl portion, and driving connections respectively interconnecting said gears and said doors for rotating the doors as the gears rotate in movement along their associated racks upon translational movement of the aft cowl portion.

5. A thrust reverser as in claim 4, said driving connections comprising a plurality of power hinges for respectively connecting said doors pivotally to said aft cowl portion.

6. A thrust reverser as in claim 5, said driving connections further comprising flexible shafts operatively connecting said rotary hinges and said gears.

7. A thrust reverser for a fan type jet propulsion engine having an inner wall and a fan concentric therewith and extended radially beyond said wall, comprising, a cowling surrounding said fan and spaced from said wall to form a bypass duct, said cowling being split into abutting forward and aft cowl portions forming inner and outer flow surfaces in cruise position, a ring of flow reversing cascades disposed within said cowling and secured to said forward cowl portion, a plurality of peripherally disposed blocker doors pivoted to said aft portion and forming part of the inner flow surface thereof in cruise position, actuating means disposed within said cowling and controllably connecting said aft cowling portion for translating said aft portion downstream to an extended position for uncovering said cascades to open the flow areas therethrough, and means carried by the aft cowl portion and operable independently of said actuating means and of the translational movement of the aft cowl portion effected thereby for rotating said doors into extended blocking position in said duct to block the flow area therethrough selectively before, after or during the translational movement of the aft portion to said extended downstream position thereof.

8. A thrust reverser as in claim 7 wherein said actuating means comprises a plurality of peripherally spaced linear actuators having actuator shafts pivotally secured to the aft cowl portion for translational movement therewith.

9. A thrust reverser as in claim 8 wherein said aft cowl portion is slidably supported on said ring of flow reversing cascades to effect said translational movement thereof.

10. A thrust reverser as in claim 7 and comprising power hinges for respectively pivotally securing said doors to said aft cowl portion, a plurality of air motors peripherally spaced and supported on the aft cowl portions, and flexible shaft connections between said power hinges and said motors to synchronously effect the rotational movements of the doors under power of said motors.

References Cited

UNITED STATES PATENTS

| | | | |
|---|---|---|---|
| 3,153,321 | 10/1962 | Spears | 239—265.31 |
| 3,262,270 | 7/1966 | Beavers | 60—226 |
| 3,262,271 | 7/1966 | Beavers | 60—226 |

CARLTON R. CROYLE, Primary Examiner

A. D. HERRMANN, Assistant Examiner

U.S. Cl. X.R.

60—226; 239—265.29, 265.31